United States Patent
Abdelsalam et al.

(10) Patent No.: US 11,805,781 B1
(45) Date of Patent: Nov. 7, 2023

(54) ECO-FRIENDLY CONTROL OF RED PALM WEEVIL USING GREEN SYNTHESIZED SILVER NANOPARTICLES OF CHLOROPHYLL DERIVATIVES

(71) Applicant: KING FAISAL UNIVERSITY, Al-Ahsa (SA)

(72) Inventors: Basem Mohamed Abdallah Abdelsalam, Al-Ahsa (SA); Enas Ali Abdelkader, Al-Ahsa (SA); Salaheldin Abdelraouf, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/134,143

(22) Filed: Apr. 13, 2023

(51) Int. Cl.
*A01N 59/16* (2006.01)
*B82Y 30/00* (2011.01)
*B82Y 40/00* (2011.01)
*C01G 5/00* (2006.01)
*A01P 7/04* (2006.01)

(52) U.S. Cl.
CPC ............... *A01N 59/16* (2013.01); *A01P 7/04* (2021.08); *B82Y 30/00* (2013.01); *B82Y 40/00* (2013.01); *C01G 5/00* (2013.01); *C01P 2002/01* (2013.01); *C01P 2002/72* (2013.01); *C01P 2002/84* (2013.01)

(58) Field of Classification Search
CPC .............. A01N 59/16; A01P 7/04; C01G 5/00
See application file for complete search history.

(56) References Cited

U.S. PATENT DOCUMENTS

2013/0209386 A1  8/2013  Cove et al.

FOREIGN PATENT DOCUMENTS

KR  1020210065557 A  6/2021
WO  2015024574 A1  2/2015

OTHER PUBLICATIONS

Mohd Yusuf, Silver Nanoparticles: Synthesis and Applications, Handbook of Ecomaterials, pp. 2343-2356 (Year: 2018).*
Ahmed, S.S. et al., "Field Evaluation of Some Photosensitizers and Nanocomposites Against Cotton Leaf Worm, *Spodoptera littoralis* (Bois.) (Lepidoptera: Noctuidae)", Middle East Journal of Applied Sciences 8(4): pp. 1471-1479 (2018).
Merghany, M.M. et al., "Yield, Quality and Leaves Anatomy Structure of Spring Onion Sprayed by Nanocomposite to Control Thrips Tabaci", Plant Archives 19(1): pp. 1839-1849 (2019).
Schnitzer, C.S. et al., "Surface-Enhanced Resonance Raman Scattering and Visible Extinction Spectroscopy of Copper Chlorophyllin: An Upper Level Chemistry Experiment" J. Chem. Educ. 87(4): pp. 429-432 (2010).
Abbas, W.T. et al., "Evaluation of Using of Some Novel Natural Nano-Pesticides on Fish Health and Water Physico-Chemical Parameters", Egyptian Journal of Aquatic Biology & Fisheries 26(2): pp. 31-44 (2022).

* cited by examiner

*Primary Examiner* — Carlos A Azpuru
(74) *Attorney, Agent, or Firm* — Nath, Goldberg & Meyer; Richard C. Litman

(57) ABSTRACT

Silver nanoparticles made by a green synthesis method using silver nitrate and a chlorophyll derivative, such as a chlorophyllin are provided. The thus produced silver nanoparticles can have a crystalline structure and an average particle size ranging from about 10 nm to about 40 nm. The disclosed silver nanoparticles may be useful in treating, preventing, and/or reducing insect infestation of a variety of plants, particularly date palms.

6 Claims, 2 Drawing Sheets

(A)

(B)

1

ECO-FRIENDLY CONTROL OF RED PALM WEEVIL USING GREEN SYNTHESIZED SILVER NANOPARTICLES OF CHLOROPHYLL DERIVATIVES

BACKGROUND

1. Field

The disclosure of the present patent application relates to silver nanoparticles, and particularly, to silver nanoparticles synthesized using chlorophyll derivatives.

2. Description of the Related Art

The date palm is one of the essential kinds of food main crop in the arid lands of the Middle East. The red palm weevil, Rhynchophorus ferrugineus (Olivier), is the most dangerous pest of date palms, which damages its internal tissues by the larval stage. The urgent need for the use of insecticides to control these red palm weevils, as well as other insect, is countered by the fear of the side effects of such insecticides on the environment. Thus, management of this serious pest currently needs to rely on an integrated control management, including using environmentally safe insecticides, such as bio-insecticides, especially those of plant origin.

Chlorophyll derivatives are natural products reported to be effective against several insect pests and snails. Chlorophyll is the pigment that gives plants and algae their green color. Plants use chlorophyll to trap light needed for photosynthesis. The basic structure of chlorophyll is a Porphyrin ring similar to that of heme in hemoglobin, although the central atom in chlorophyll is magnesium instead of iron. The long hydrocarbon (phytol) tail attached to the Porphyrin ring makes chlorophyll fat-soluble and insoluble in water. Two different types of chlorophyll (chlorophyll a and chlorophyll b) are found in plants. The small difference in one of the side chains allows each type of chlorophyll to absorb light at slightly different wavelengths.

Chlorophyllin is a semi-synthetic mixture of water soluble sodium copper salts derived from chlorophyll. During the synthesis of Chlorophyllin, the magnesium atom at the center of the ring is replaced with copper and the phytol tail is lost. Unlike natural chlorophyll, Chlorophyllin is water-soluble. More research is needed to understand the bioavailability and metabolism of natural chlorophylls and chlorine compounds in synthetic Chlorophyllin. Accordingly, it has proven difficult to date to use chlorophyll derivatives in an effective insecticide treatment.

Synthesis of nanoparticles has been achieved by a variety of methods, including physicochemical, thermal decomposition, electrochemical, microwave assisted, sonochemical, solvothermal, photosynthesis, photochemical reduction, chemical reduction and continuous-flow methods. These methods are often costly or produce by-products that pose increased risks to human health and the environment.

In recent years, green or environmentally friendly chemical methods have been developed to prepare nanoparticles using plant extracts. Green chemistry has the advantage of being safer, faster, environmentally friendly, and economical. However, the rise of green methods of preparing nanoparticles has also demonstrated that the activities and characteristics of the nanoparticles vary significantly, depending upon the detailed method of synthesis and specific plant extract used. Further, the therapeutic potential of plant extracts has been compromised due to the lack of controlled delivery of an effective dose to the desired target site.

Thus, nanoparticles synthesized using an environmentally friendly method solving the aforementioned problems are desired.

SUMMARY

The present subject matter relates to eco-friendly methods and compositions for controlling insect infestations in date palms including, by way of non-limiting example, red palm weevil infestation. In one aspect, the present subject matter relates to controlling red palm weevil infestation of date palms by using green synthesized silver nanoparticles (AgNPs) of chlorophyll derivatives. These silver nanoparticles can have a spherical shape and a crystalline structure. In an embodiment, the silver nanoparticles can have an average particle size ranging from about 10 nm to about 40 nm in diameter.

In an embodiment, the present subject matter relates to a method of synthesizing silver nanoparticles, comprising: mixing a solution of chlorophyllin with a solution of silver nitrate to provide a silver solution; heating the silver solution at a temperature of about 80° C. for about 3 hours to obtain a heated solution containing silver nanoparticles; centrifuging the heated solution containing silver nanoparticles to separate initial silver nanoparticles from the heated solution; redispersing the initial silver nanoparticles in water to obtain a silver nanoparticle dispersion; and centrifuging the silver nanoparticle dispersion to obtain the silver nanoparticles. In an embodiment, the method can further comprise lyophilizing the silver nanoparticles to obtain lyophilized silver nanoparticles (L-AgNPs) powder.

According to an embodiment, the present subject matter relates to silver nanoparticles prepared by the methods as described herein.

According to an embodiment, the present subject matter relates to a method of controlling insect infestation of date palms, comprising applying to date palms an effective amount of the silver nanoparticles as described herein.

These and other features of the present subject matter will become readily apparent upon further review of the following specification and drawings.

BRIEF DESCRIPTION OF THE DRAWINGS

(FIG. 1B) XRD spectrum for the AgNPs.

(FIG. 2B) a dynamic light scattering (DLS) histogram analysis of the AgNPs.

DETAILED DESCRIPTION OF THE PREFERRED EMBODIMENTS

Figure 1A:
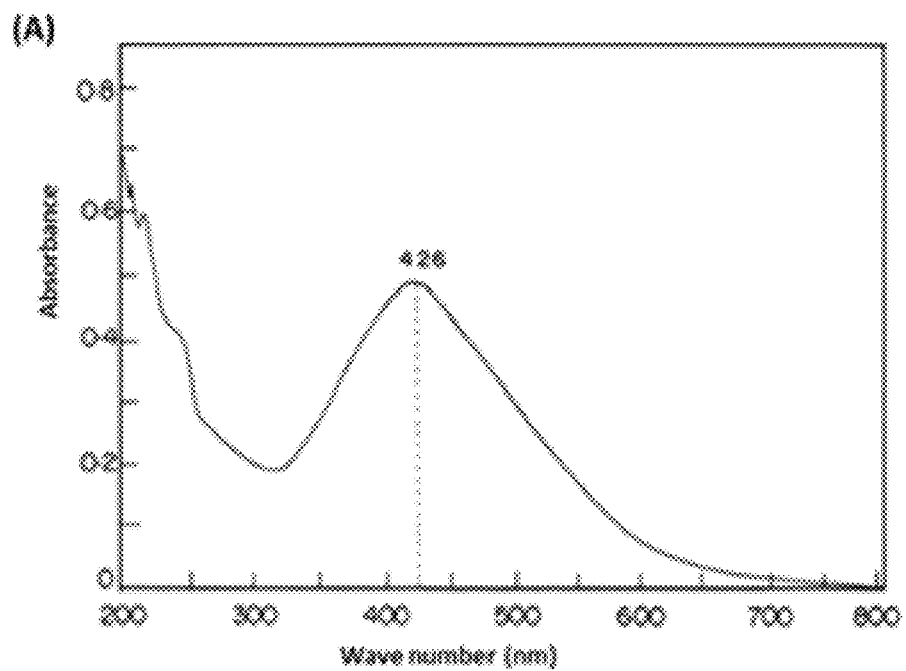
FIGS. 1A-1B depict (FIG. 1A) UB-Vis spectrum of AgNPs synthesized herein.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

The present subject matter relates to eco-friendly methods and compositions for controlling insect infestations in date palms including, by way of non-limiting example, red palm weevil infestation. In one aspect, the present subject matter relates to controlling red palm weevil infestation of date palms by using green synthesized silver nanoparticles (AgNPs) of chlorophyll derivatives. These silver nanoparticles can have a spherical shape and a crystalline structure. In an embodiment, the silver nanoparticles can have an average particle size ranging from about 10 nm to about 40 nm in diameter.

In an embodiment, the present subject matter relates to a method of synthesizing silver nanoparticles, comprising: mixing a solution of chlorophyllin with a solution of silver nitrate to provide a silver solution; heating the silver solution at a temperature of about 80° C. for about 3 hours to obtain a heated solution containing silver nanoparticles; centrifuging the heated solution containing silver nanoparticles to separate initial silver nanoparticles from the heated solution; redispersing the initial silver nanoparticles in water to obtain a silver nanoparticle dispersion; and centrifuging the silver nanoparticle dispersion to obtain the silver nanoparticles. In an embodiment, the method can further comprise lyophilizing the silver nanoparticles to obtain lyophilized silver nanoparticles (L-AgNPs) powder.

In an embodiment, the chlorophyllin used in the present synthetic methods is chlorophyllin sodium copper salt. In this regard, chlorophyllin sodium copper salt is a water-soluble derivative of chlorophyll and can be obtained after removal of the phytol from chlorophyll. Any other similar water-soluble chlorophyl derivative may be usable herein. In another embodiment, the solution of chlorophyllin contains about 300 µg of chlorophyllin per mL of water. Similarly, in an embodiment, the solution of silver nitrate is an about 10 mM solution of silver nitrate in water. For example, an about 100 mL solution of chlorophyllin containing about 300 µg of chlorophyllin per mL of water can be mixed with an about 50 mL of silver nitrate that is an about 10 mM solution of silver nitrate in water.

In a further embodiment, the synthetic methods result in silver nanoparticles that are capped with the chlorophyllin. In this regard, the chlorophyllin acts as a reducing, capping, and stabilizing agent in the present processes to convert silver ions into silver nanoparticles. The thus green synthesized silver nanoparticles alone can be employed in the present methods. In an embodiment, the bio-reduction process converts Ag$^+$ to Ag$^0$ nanoparticles as evidenced by the color change of the solution from colorless to brown. The complete reduction can be verified by observing the change of color from colorless to brown.

While the present synthesis methods, in an embodiment, comprise heating the silver solution at a temperature of about 80° C. for about 3 hours to obtain a heated solution containing silver nanoparticles, other times and temperatures may further be possible. For example, heating the silver solution can be conducted at a temperature of about 70-90° C., or about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., or about 90° C., for about 2-4 hours or greater, or about 2 hours, about 2.5 hours, about 3 hours, about 3.5 hours, or about 4 hours. However, it is expected that heating the silver solution at a temperature of about 80° C. for about 3 hours will provide the optimal results and complete reduction of silver ions into metallic silver nanoparticles. All other steps in the present synthesis methods can be conducted at room or ambient temperature.

In another embodiment, any centrifugation conducted herein can be conducted, for example, at about 15,000 g for about 30 minutes, or for about 15-60 minutes.

Once the present silver nanoparticles (AgNPs) are formed, UV-visible spectrophotometry can be used to verify the formation of the green AgNPs. For example, the UV-Vis spectrum of FIG. 1A shows that the green AgNPs presented surface plasmon resonance at 420 nm. Similarly, the present green synthesized AGNPs using chlorophyllin can also be characterized by imaging (transmission electron microscopy (TEM)—See FIG. 2A), zeta potential, X-Ray Diffraction (XRD)—See FIG. 1B, dynamic light scattering (DLS) histogram—see FIG. 2B, and Fourier transform infrared spectroscopy (FTIR).

In another embodiment, the present subject matter relates to a method of controlling insect infestation of date palms, comprising applying to date palms an effective amount of the silver nanoparticles as described herein. In this regard, the controlling insect infestation can include one or more of treating the insect infestation, preventing the insect infestation, and killing any insects infesting the date palms. In another embodiment, the controlling insect infestation can include one or more of decreasing a percentage of pupation, emergence, hatchability, and longevity of any adult insects infesting the date palm. The present methods are highly desirable in that applying the silver nanoparticles to the date palms does not cause any side effects to the date palms or a surrounding environment thereof.

In another embodiment, the present AgNPs can be used to control insect infestation, including by way of non-limiting example insects that are red palm weevils. In other embodiments, the present green AgNPs can be used to control infestations of any insects found in the following Table 1, known as insect pests associated with date palm roots, bases, and stem (trunk).

In an embodiment, the present silver nanoparticles do not require a carrier or any other delivery vehicle for application to the date palm. Application of the silver nanoparticles herein directly to the date palms will be considered to be an effective treatment.

The present teachings are illustrated by the following examples.

Example 1

Green Biosynthesized Silver Nanoparticles Using Chlorophyllin

A solution of Chlorophyllin 100 mL (300 µg/mL) was mixed with 50 mL solution of silver nitrate (AgNO3) (10 mM). The solution was mixed with heating at 80° C. for 3 hours with stirring. The complete reduction was verified by a change in color from colorless to brown. The green biosynthesized AgNPs were separated by centrifugation at 15,000 g for 30 min. The pellet was re-dispersed in water, centrifuged, and lyophilized to obtain L-AgNPs powder. UV-visible spectrophotometry was used to verify the formation of the green AgNPs that presented surface plasmon resonance at 420 nm. Green biosynthesized AgNPs using Chlorophyllin were characterized by imaging (transmission electron microscopy (TEM), UV-VIS spectroscopy, zeta potential, X-ray diffraction (XRD), Energy dispersive x-ray analysis (EDX), and Fourier transform infrared spectroscopy (FTIR).

Figure 1B:
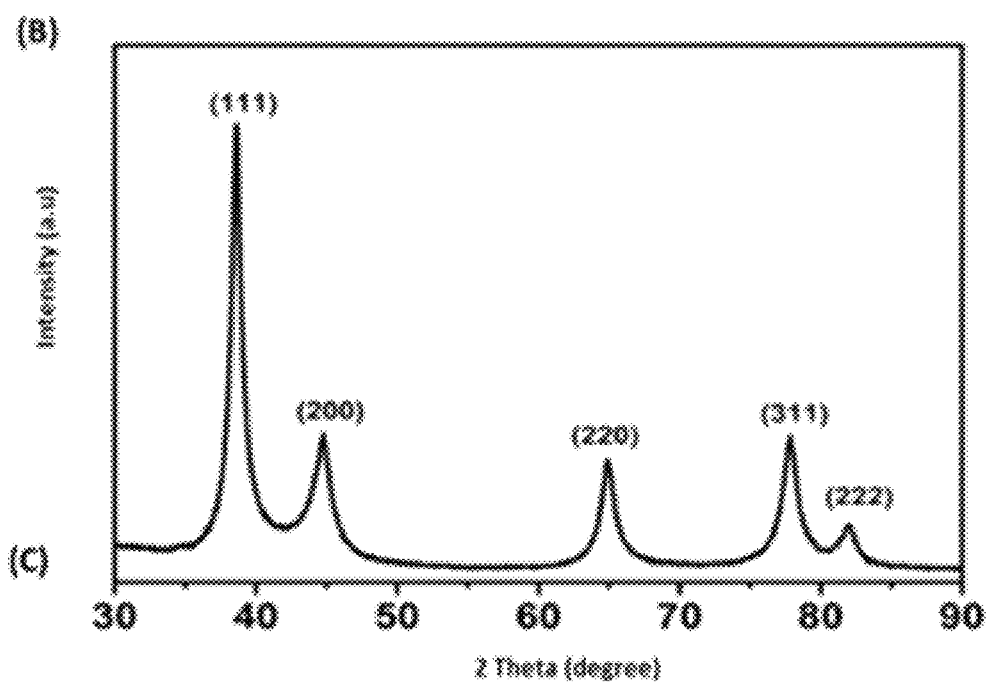

FIGS. 1A-1B depict (FIG. 1A) X-ray diffraction (XRD) analysis of the AgNPs; and (FIG. 1B) X-ray diffraction (XRD) spectrum of the AgNPs. The peak values for the UV-vis were plotted between AgNPs/absorbance ratios. The highest absorption peak was at about 426 nm, corresponding to the Plasmon resonance of AgNPs.

TABLE 1

| Scientific | Common name | Order/family |
|---|---|---|
| Roots | | |
| Oryctes agamemnon arabicus Burmeister | Fruitstalk or stem borer | Col., Scarabaeidae |
| Oryctes rhinoceros | Rhinoceros beetle | Col., Scarabaeidae |
| Aspongopus viduatus F. | Water melon bug | Hem., Pentatomidae |
| Gryllotalpa gryllotalpa L. | Mole cricket | Orth., Gryllotalpidae |
| Base and stem (trunk) | | |
| Rhynchophorus ferrugineus Oliv. | Red palm weevil | Col., Curculionidae |
| Rhynchophorus phoenicis Fabricius | African palm weevil | Col., Curculionidae |
| Sphenophorus parampunctatus | Date palm beetle | Col., Curculionidae |
| Xyleborus perforans | Bark beetle | Col., Curculionidae |
| Jebusaea hammerschmidti Reiche | Stem borer | Col., Cerambycidae |
| Macrotoma palmata F. | Sunt borer | Col., Cerambycidae |
| Apatophysis barbara (Lucas) | Date palm borer | Col., Cerambycidae |
| Elaphidion villosum | Stalk borer | Col., Cerambycidae |
| Strategus julianus Burmeister | Young date palm borer | Col., Scarabaeidae |
| Paysandisia archon Burmeister | The palm borer moth | Lep., Castniidae |
| Odontotermis smeathmani Ful. | Termites | Isopt., Termitidae |
| Odontotermis sudanensis Sjöstedt | Termites | Isopt., Termitidae |
| Odontotermis obesus Rambur | Termites | Isopt., Termitidae |
| Microcerotermes diversus Silvestri | Small waxy termites | Isopt., Termitidae |
| Amitermes stephensoni Harris | Termites | Isopt., Termitidae |
| Amitermes desertorum (Desneux) | Termites | Isopt., Termitidae |
| Psammotermes hypostoma (Desneux) | Sand termites | Isopt., Rhinotermitidae |
| Heterotermes aethiopicus (Sjostedt) | Termites | Isopt., Rhinotermitidae |
| Microtermes najdansis | Termites | Isopt., Termitidae |
| Anacanthotermes orchraceus (Burmeister) | Harvester termites | Isopt., Hodotermitidae |
| Anacanthotermes ubachi (Navas) | Termites | Isopt., Hodotermitidae |
| Acanthophorus arabicus Thomson | Cerambycid beetle | Col., Cerambycidae |

The diffraction peaks for the AgNPs in the XRD analysis were observed at 2θ values=38.2, 44.4, 64.5, 77.5, and 81.6, which could be assigned to the 111, 200, 220, 211, and 222 crystallographic planes, respectively.

Figure 2A:
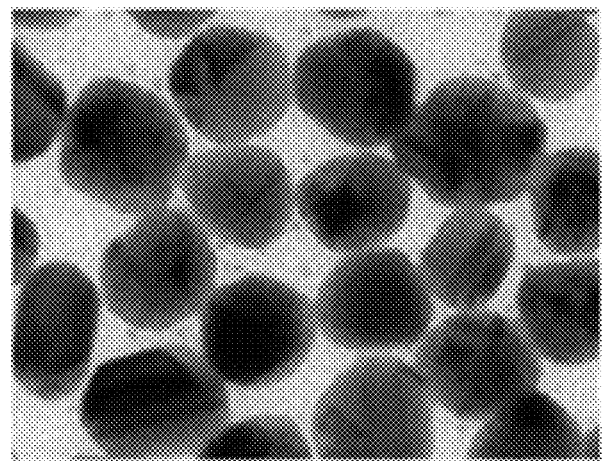
FIGS. 2A-2B depict (FIG. 2A) transmission electron microscopy (TEM) images showing the AgNPs formed with spherical structures.
Figure 2B:
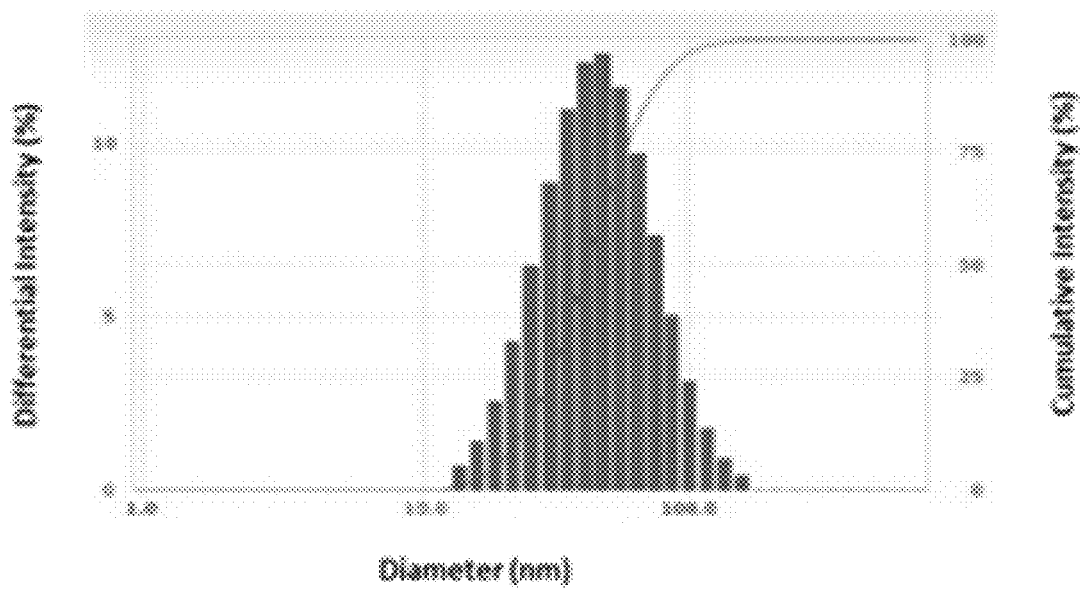

The size and morphology of the nanoparticles were examined, and TEM images were obtained. FIG. 2A depicts transmission electron microscopy (TEM) images showing the AgNPs formed with a diameter of 10-40 nm. FIG. 2B is a dynamic light scattering (DLS) histogram showing the average size of colloidal AgNPs is 50.4 nm.

It is to be understood that the silver nanoparticles are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of synthesizing silver nanoparticles, comprising:
    mixing a solution of chlorophyllin with a solution of silver nitrate to provide a silver solution;
    heating the silver solution at a temperature of about 80° C. for about 3 hours to obtain a heated solution containing silver nanoparticles;
    centrifuging the heated solution containing silver nanoparticles to separate initial silver nanoparticles from the heated solution;
    redispersing the initial silver nanoparticles in water to obtain a silver nanoparticle dispersion; and
    centrifuging the silver nanoparticle dispersion to obtain the silver nanoparticles.

2. The method of claim 1, wherein the chlorophyllin is chlorophyllin sodium copper salt.

3. The method of claim 1, wherein the solution of chlorophyllin contains about 300 μg of chlorophyllin per mL of water.

4. The method of claim 3, wherein the solution of silver nitrate is an about 10 mM solution of silver nitrate in water.

5. The method of claim 1, wherein the silver nanoparticles are capped with the chlorophyllin.

6. The method of claim 1, further comprising lyophilizing the silver nanoparticles to obtain lyophilized silver nanoparticles (L-AgNPs) powder.

* * * * *